United States Patent [19]
Topliffe

[11] 3,774,487
[45] Nov. 27, 1973

[54] DOUGH SLICER
[76] Inventor: Doris H. Topliffe, 1710 Brookside Ter., Tacoma, Wash. 98465
[22] Filed: Aug. 18, 1971
[21] Appl. No.: 172,783

[52] U.S. Cl. .................................. 83/278, 83/437
[51] Int. Cl. ............................................. B26d 4/42
[58] Field of Search .......................... 214/1.5, 1.6; 83/223, 278, 437, 222; 146/158; 425/311

[56] References Cited
UNITED STATES PATENTS

| | | | |
|---|---|---|---|
| 3,180,195 | 4/1965 | Clark | 83/437 |
| 3,508,591 | 4/1970 | Johnson et al. | 146/158 |
| 3,500,541 | 3/1970 | Hammerlund, Jr. | 425/311 X |
| 599,414 | 2/1898 | York | 83/278 |
| 1,065,620 | 6/1913 | Muller | 214/1.5 |
| 2,660,962 | 12/1953 | Bloxham | 83/437 |
| 2,657,926 | 11/1953 | Price et al. | 83/222 |
| 3,283,631 | 11/1966 | Strom | 83/222 X |

FOREIGN PATENTS OR APPLICATIONS

| | | | |
|---|---|---|---|
| 11,063 | 9/1927 | Australia | 425/311 |

*Primary Examiner*—J. M. Meister
*Attorney*—Eugene D. Farley

[57] ABSTRACT

A slicer for slicing dough into pizza rounds comprises an elongated holder open at both ends for holding a quantity of dough. A motor driven ram is positioned at the rearward end of the holder for ejecting the dough stepwise from the forward end thereof. A motor driven knife is positioned at the forward end of the holder for slicing the dough as it is ejected. Timing means connected to the ram and knife motors actuate them in alternating relation to each other.

1 Claim, 6 Drawing Figures

Doris H. Topliffe
INVENTOR

BY Eugene O. Farley

Atty.

Doris H. Topliffe
INVENTOR
BY Eugene D. Farley
Atty.

DOUGH SLICER

This invention relates to dough slicers. It pertains particularly to slicers for use in cutting pizza dough, bread dough, biscuit dough, pie dough, cookie dough and the like into blanks preliminary to baking.

The classic method of preparing the dough used in making pizzas, bread, biscuits, pie and cookies has been to roll out a quantity of the dough into a flat sheet and then cut it into shape with suitable cutters. This method is time consuming, requires a large work space, and necessitates working over the scrap dough pieces to avoid substantial waste of dough. It is the general purpose of the present invention to provide a slicer which will cut a mass of dough into blanks or rounds of the desired thickness and diameter without the necessity of first rolling the dough into a thin sheet.

It is a further object of the present invention to provide a dough slicer which is of high capacity; which will process large chunks of dough, i.e., chunks weighing as much as 125 pounds, which is adaptable to cutting rounds of large or small diameter; and which is adjustable to cut slices of predetermined thickness.

A further object of the invention is the provision of a dough slicer which is simple in its construction; adaptable for use in small or large bakeries; and sanitary and easy to keep clean.

In its broad aspect, the presently described dough slicer comprises an elongated holder open at both ends for holding a quantity of dough. A motor driven ram is positioned behind the dough for ejecting it from the holder. A motor driven knife is stationed at the outfeed side of the holder for slicing the dough as it is ejected. A suitable control connected to the motors of the ram and knife actuates them in alternating relation to each other. The action thus is to eject a first dough segment, cut it off, eject a second segment, cut the second segment off, and so on. Using the apparatus it is possible to reduce a 125 pound dough charge to slices a fraction of an inch thick in a time period of about 3 minutes.

Considering the foregoing in greater detail and with particular reference to the drawings, wherein.

Figure 5:
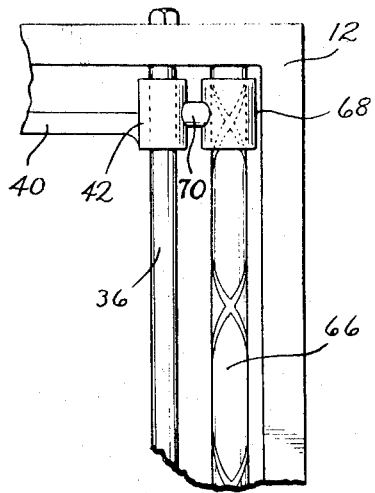
Figure 2:
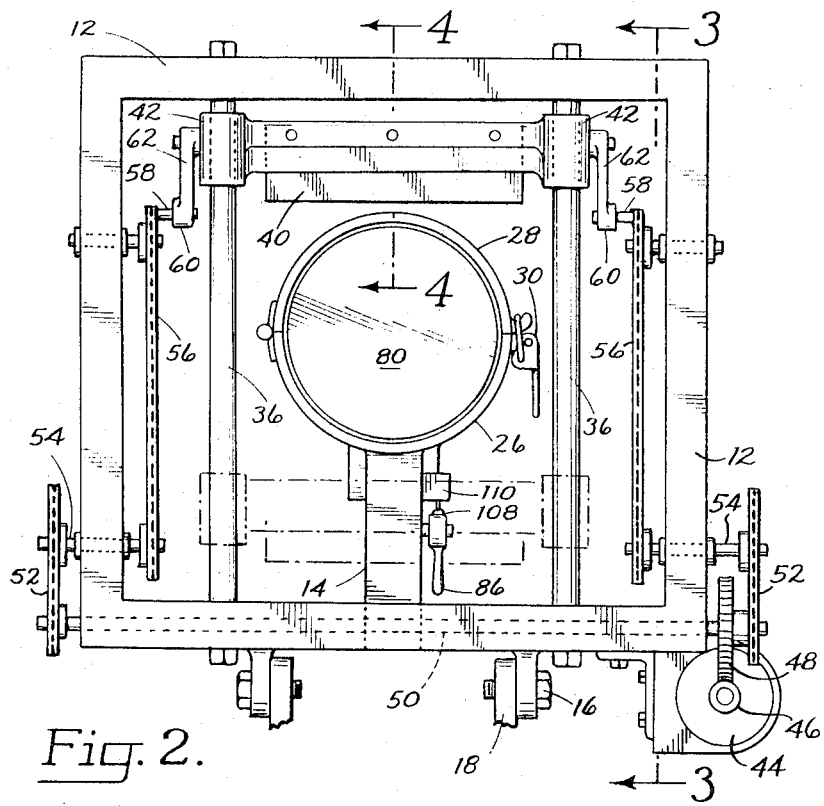
FIG. 2 is a view in front elevation of the slicer.
Figure 3:
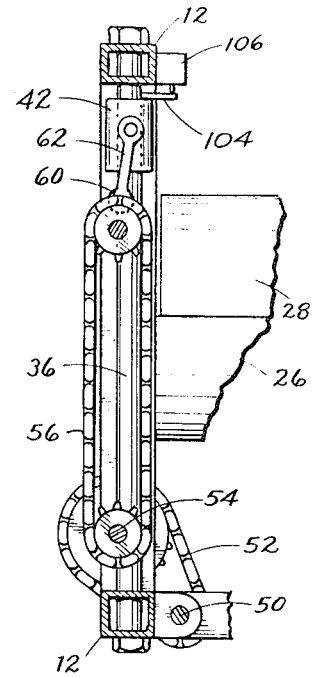
Figure 6:
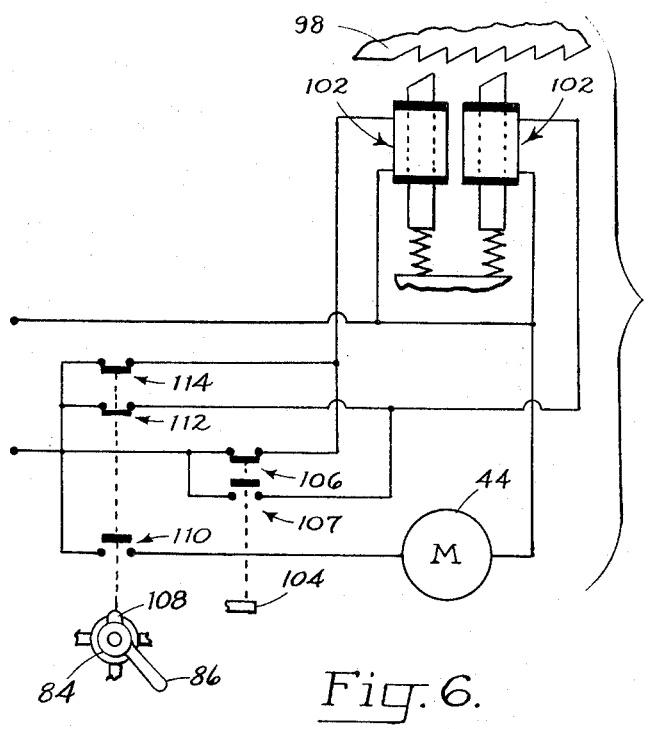
Figure 4:
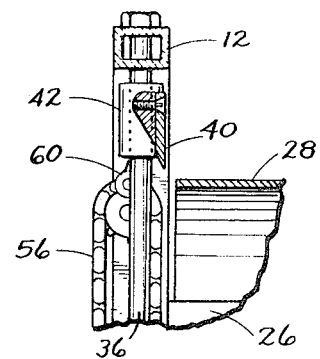

FIGS. 3 and 4 are fragmentary vertical sectional views taken along lines 3—3 and 4—4 of FIG. 2, respectively, FIG. 5 is a fragmentary view in front elevation illustrating an alternate slicer drive, and FIG. 6 is a schematic electrical circuit illustrating the control for the slicer.

Figure 1:
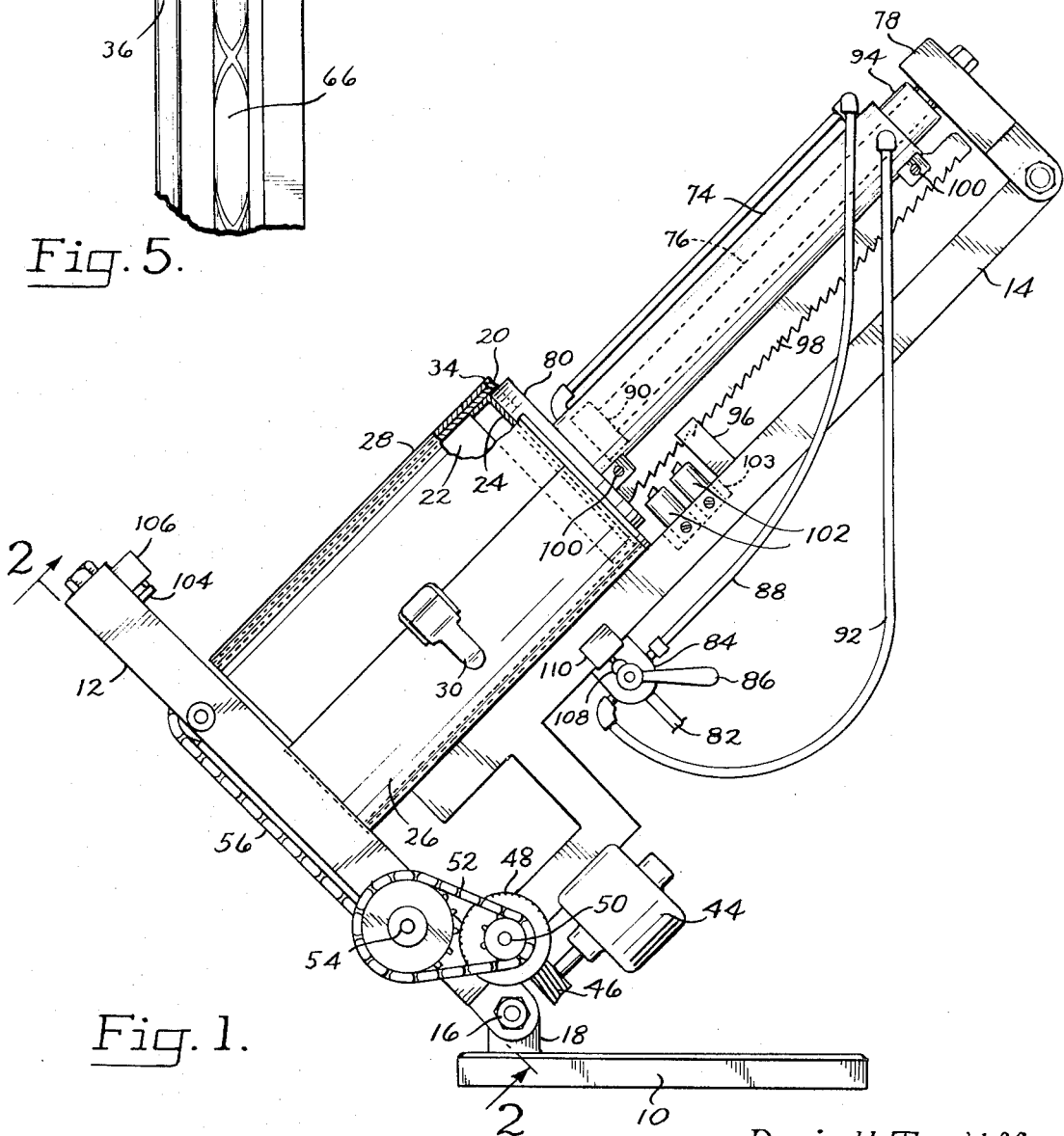
FIG. 1 is a view in side elevation of the herein described dough slicer.

Referring to FIGS. 1 and 2:

The dough slicer of my invention is mounted on a heavy base 10 in such a manner that it may be tilted at a convenient angle for loading and operation. To this end a frame having a vertical component 12 and a horizontal component 14 is pivotally mounted by means of bolts 16 to a standard 18 extending upwardly from the forward end of base 10. Frame component 12 supports principally the knife mechanism while frame component 14 supports principally the dough holding and advancing mechanism.

The dough holding mechanism comprises a tube 20 which may be made of stainless steel, plastic or ceramic ware. It is open at both ends. Its diameter may be substantial, for example 10 inches or more, where pizza rounds are to be cut. Its length may be as desired, for example 2 or 3 feet. The total weight of the dough 22 charged to it thus may be substantial; for example from 100 to 150 pounds.

The dough charge may be either leavened or unleavened, depending upon the nature of the contemplated end product. If leavened, it should be in its unraised condition. In either case, for optimum slicing it should be frozen to a continuously solid but non crystalline condition.

A cup 24 advantageously may be placed over the downstream end of the charge to protect it from contamination by the ram, and also to distribute uniformly the force exerted by the latter.

Thus the baker normally will prepare any desired number of charges by placing cups 24 in the bottoms of a number of cylinders 20, filling the cylinders with dough in a plastic condition, freezing the dough and keeping it in frozen storage until required for use.

When the dough is to be sliced, tube 20 and the dough charge that it contains is placed in a case 26 mounted in frame 12 and having a hinged lid 28 which may be adjusted between open and closed positions. When closed, it is releasably locked in place by means of a lever-operated fastener 30 of conventional kind.

Further to retain holder 20 in its operative position there is provided around its top margin an outwardly extending flange 34. This engages the upper end of case 26. The holder and dough charge thus are adequately supported, and also prevented from sliding downwardly out of operative position, even though the apparatus is in the inclined position of FIG. 1.

The construction and mode of operation of the knife means employed to slice rounds of dough from the charge contained in holder 20 are illustrated in FIGS. 2, 3 and 4.

Frame 12 supports a pair of vertical, parallel, spaced guide posts 36 in a location directly adjacent the discharge end of holder 20. The guide posts mount a guillotine type knife 40 supported on a pair of slides 42. These are slidably mounted on posts 36.

Reciprocating drive means are provided for reciprocating knife 40 in a cutting stroke illustrated by the full and dotted line positions of FIG. 2.

In a first embodiment, the drive means comprises a variable speed motor 44, the shaft of which mounts a worm 46. The worm drives a worm gear 48 which in turn drives a drive shaft 50 extending from side to side of the apparatus.

Shaft 50 drives a pair of chain and sprocket assemblies 52 which in turn drive a pair of secondary shafts 54, one on each side. The latter shafts drive a pair of drive chains 56. Each of these has a link mounting a pin 58. The latter are received in bearings 60 carried by the outer ends of connecting arms 62. The inner ends of the arms are pivotally attached to slides 42. Knife 40 thus may be driven in reciprocating movement at a speed determined by the speed of motor 44 and its asoociated linkages.

An alternate reciprocating drive for the knife is illustrated in FIG. 5. It substitutes for drive chains 56 a pair of vertical, endless spiral cams 66 with associated cam followers 68. The latter are connected by means of pins 70 to slides 42. Like chains 56, cams 66 provide a positive drive of sufficient power to drive knives 40 through the frozen dough charge.

The construction and mode of operation of the ram means employed for advancing the dough charge from holder 20 to knife 40 is illustrated in FIG. 1.

A fluid operated cylinder, preferably a pneumatic cylinder 74, is mounted on horizontal frame segment 14. The cylinder is of the fixed piston type.

The outer end of piston rod 76 of the cylinder is bolted to a standard 78 which extends upwardly from the outer extremity of frame member 14. The base 80 of the cylinder serves as a ram fitting within holder 20. It bears against cap 24 which confines the dough.

Air under pressure is supplied to cylinder 74 through a circuit which includes a pipe 82 connected to a source of compressed gas, a three-way valve 84 with manual operating handle 86, a conduit 88 which interconnects valve 84 and the chamber behind piston 90, and another conduit 92 which interconnects the valve and the chamber in front of piston 90. By supplying air under pressure to one or the other of conduits 88, 92, ram 80 may be advanced or retracted between limits determined by the stroke of the piston and the position of a stop 94 fixed to piston rod 76.

Means are provided for securing the stepwise advancement of ram 50 by increments which determine the thickness of the rounds of dough cut off by knife 40.

For this purpose there is provided a toothed bar 98. The bar is removably attached to the underside of cylinder 74 by bolts 100. It is kept from turning by guides 96.

A pair of spring-pressed, solenoid-operated dogs 102 are mounted adjustably in a recess 103 on frame member 14. Upon extension of the dogs by their associated springs, they engage the teeth of bar 98. Upon retraction by solenoid action, they clear the teeth and release the bar. Thus by applying continuous air pressure to the ram and alternately advancing and retracting first one of dogs 102 and then the other, stepwise advancement of the ram may be secured.

The apparatus is controlled and timed so that there occur alternate advancement of ram 80 and actuation of knife 40 in a slicing stroke. An electric control is supplied for this purpose. Its arrangement is shown in FIG. 6.

One of slides 42 which mounts knife 40 is positioned to contact the operating arm 104 of a pair of limit switches 106, 107, which are tied together. valve operating lever 86 works a switch operator 108 positioned to contact and operate simultaneously a bank of three switches 110, 112, and 114.

FIG. 1 illustrates the apparatus with ram 80 fully withdrawn, solenoid operated dogs 102 inoperative, knife 40 inoperative and air under pressure being supplied through line 92 to maintain ram 80 in its withdrawn position. In this condition lid 28 may be raised and a holder 28 fully loaded with frozen dough 22 charged into case 26. After closing lid 28, lever 86 is moved manually to its alternate position. This has several effects.

First, it operates a valve 84 to supply air to conduit 88 behind piston 90. This in turn applies continuous pressure to ram 80.

It also opens switches 112, 114 and closes switch 110. Closing the latter switch energizes motor 44 which runs continuously and drives knife 40. Opening switches 112, 114 opens the circuits to solenoids 102, permitting their associated springs to advance the dogs into engagement with toothed bar 98. One dog only is thus advanced however, the companion dog being restrained by a secondary circuit which is closed through limit switch 106.

Operation of motor 44 drives knife 40 through one reciprocating stroke, cutting off a slice of dough. Upon completion of one full stroke of the knife, limit switch 106 is opened and 107 closed. This reverses the condition of the two dogs. Thus the dog formerly extended is retracted, while that formerly retracted is extended.

Continued application of air pressure through line 88 results in advancement of the ram by one notch of toothed bar 98, pressing out another portion of dough from block 20. Motor 44 now operates knife 40 through another cycle, slicing off another round and again operating limit switch pair 106, 107. The sequence is repeated until dough block 20 is completely exhausted. Valve operating lever 8 then is moved manually to its alternate position. This puts it back in its FIG. 6 condition, ready for processing a further quantity of frozen dough.

Having thus described my invention in preferred embodiments, I claim:

1. A dough slicer comprising:
   a. an elongated holder open at both ends for holding a quantity of dough,
   b. ram means positioned behind the dough,
   c. ram motor means connected to the ram means and comprising a fluid operated cylinder,
   d. control means connected to the ram motor means for advancing the ram means stepwise, thereby producing a stepwise ejection of the dough from the holder, the control means comprising a toothed bar mounted on the moving part of the cylinder, and two solenoid-operated dogs positioned for sequentially engaging the teeth of the bar,
   e. knife means positioned for slicing the dough as it is ejected, one slice at a time,
   f. an electric knife motor connected to the knife means for driving the same, the solenoids and knife motor being in a limit-switch-controlled electric circuit for alternate energization of the solenoids, and
   g. timing means connected to the ram motor means and knife motor for actuating them in alternating relation to each other.

* * * * *